United States Patent [19]

Kashimura et al.

[11] Patent Number: 4,625,692
[45] Date of Patent: Dec. 2, 1986

[54] APPARATUS FOR CONTROLLING IGNITION TIMING FOR INTERNAL COMBUSTION ENGINE

[75] Inventors: Yuichi Kashimura, Katsuta; Noboru Sugiura, Mito, both of Japan

[73] Assignee: Hitachi, Ltd., Tokyo, Japan

[21] Appl. No.: 712,770

[22] Filed: Mar. 18, 1985

[30] Foreign Application Priority Data

Mar. 23, 1984 [JP] Japan .................................. 59-55710

[51] Int. Cl.$^4$ ............................................... F02P 5/15
[52] U.S. Cl. .................................................... 123/425
[58] Field of Search .................... 123/425, 435; 73/35

[56] References Cited

U.S. PATENT DOCUMENTS

| | | | |
|---|---|---|---|
| 4,268,910 | 5/1981 | Omori et al. | 123/416 X |
| 4,425,891 | 1/1984 | Kashimura et al. | 123/425 |
| 4,471,736 | 9/1984 | Yoshida et al. | 123/425 |
| 4,513,718 | 4/1985 | Ishii et al. | 123/425 |
| 4,527,525 | 7/1985 | Mauermann et al. | 123/425 |

FOREIGN PATENT DOCUMENTS 68559 4/1982 Japan .

Primary Examiner—Tony M. Argenbright
Attorney, Agent, or Firm—Antonelli, Terry & Wands

[57] ABSTRACT

An angle of an ignition timing for a specific cylinder is gradually advanced. A comparison is made between the previous output of a knock detection circuit for the cylinder having its angle advanced and the present output thereof by a comparator. The comparator evaluates an occurrence of a knock when an output signal therefrom changes drastically. The signal from the comparator rewrites the knock evaluation reference value in each cylinder written in the memory. When an output from the knock sensor is larger than that of the memory, an ignition timing retard angle signal is output from the comparator. As a result, the apparatus of the present invention can control ignition timing without errors due to the deterioration with age or manufacturing errors, as it can correct knocking detection sensibility of the apparatus.

9 Claims, 21 Drawing Figures

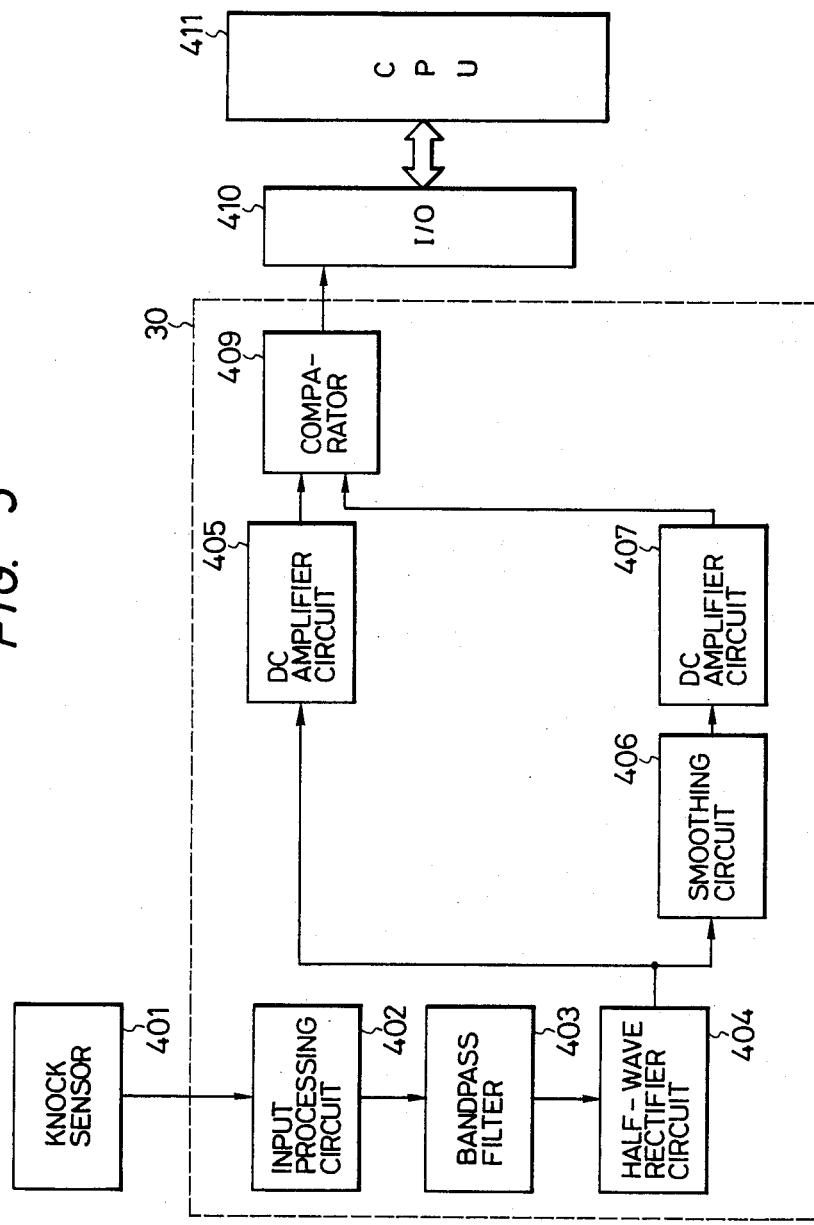

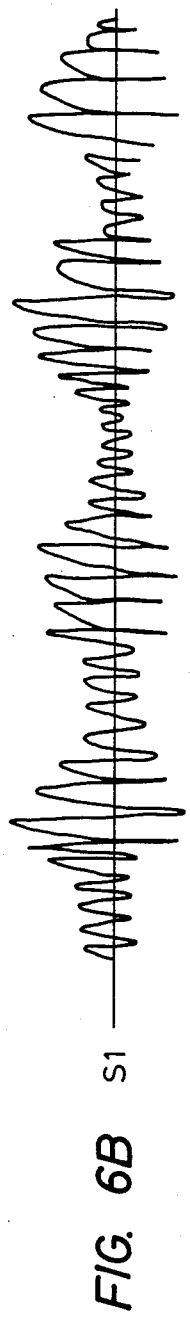
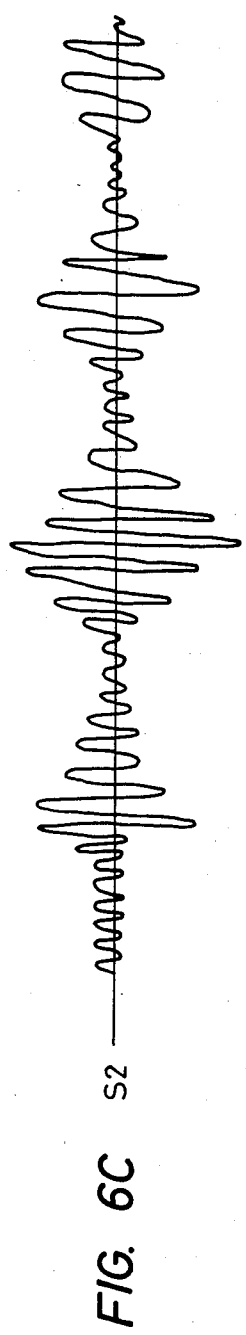
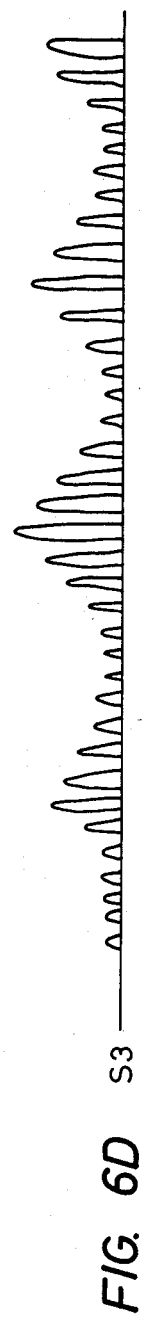
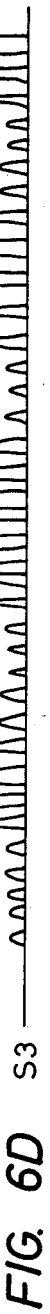
FIG. 6A  $V_{IN}$
FIG. 6B  $S_1$
FIG. 6C  $S_2$
FIG. 6D  $S_3$

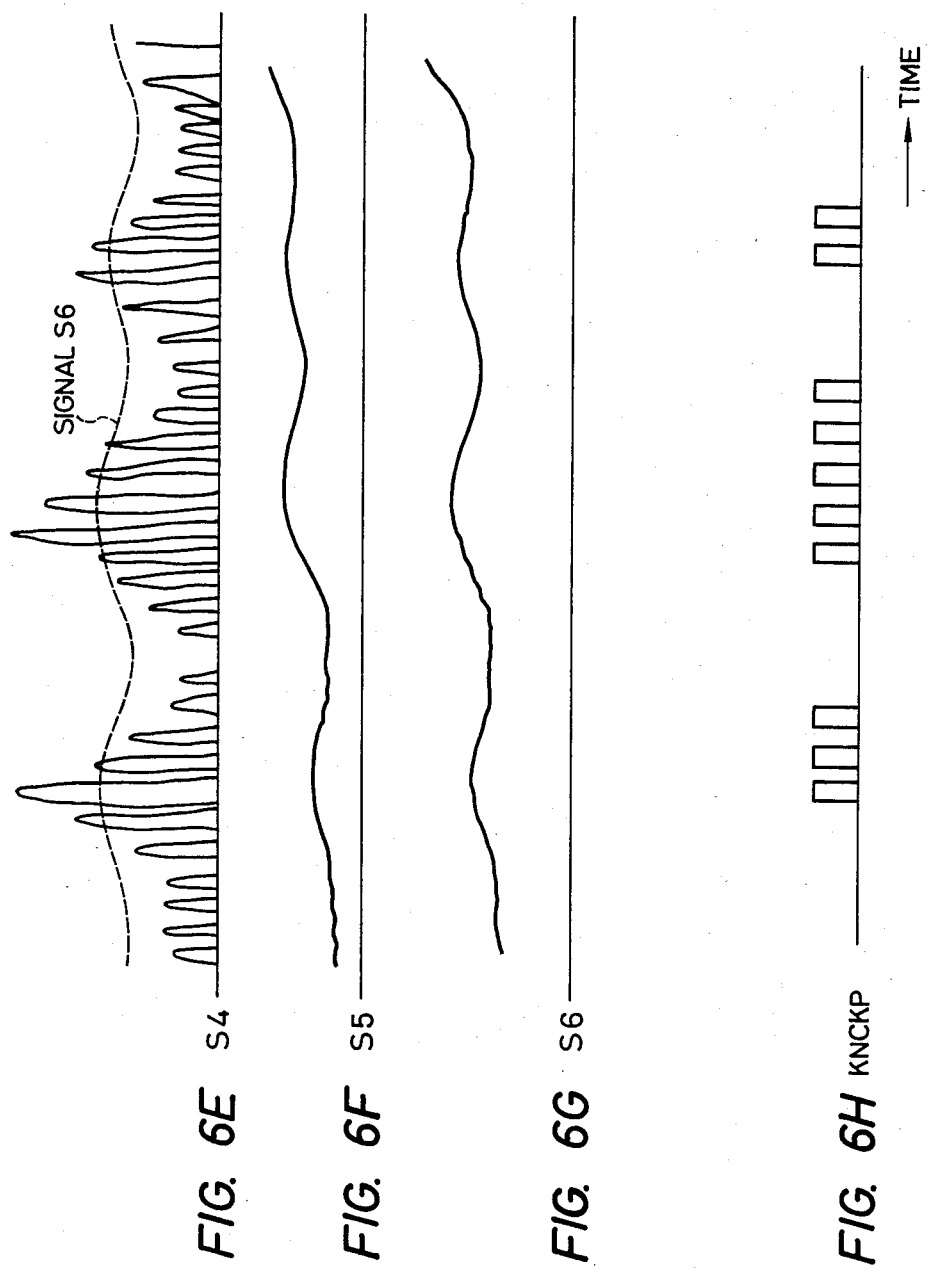

APPARATUS FOR CONTROLLING IGNITION TIMING FOR INTERNAL COMBUSTION ENGINE

FIELD OF THE INVENTION

The present invention relates to an apparatus for controlling the ignition timing of an internal combustion engine by correcting knock detection sensitivity.

BACKGROUND OF THE INVENTION

Knocking generated in an internal combustion engine causes reduction of engine output or damage due to overheating of the engine. The maximum engine output can be achieved by advancing the ignition timing to a value just before the knock occurs in the engine characteristics. If the ignition timing is further advanced the knock will occur, and if retarded further the engine output will be reduced.

It is desirable, therefore, to maintain the ignition timing at a value just before the knock occurs.

In such an ignition timing control apparatus, it is necessary to accurately judge the knock signal.

When the engine is used for a long time there is produced a variation in the clearance of the intake and exhaust valves, so that the intensity of the vibration of the engine is changed, which frequently results in an incorrect detection of the knock signal. For this reason, a checking device is required to determine whether the knock detection device is detecting proper knocking of the engine.

Examples of checking devices of this type are disclosed in Japanese Patent Laid-Open Publication Nos. 57-68559 (1982) "Knocking diagnosis apparatus" published on Apr. 26, 1982, and U.S. Pat. No. 4,425,891 "Engine knock control apparatus" published on Jan. 17, 1984.

However, those checking devices disclosed in the publications mentioned above merely judge whether the checking devices are operating or not.

Sensors used for detecting knocking are sometimes not uniform in their output characteristics, and the output characteristics differ from the original characteristics depending on the conditions of mounting the sensors on the engines. Furthermore, the characteristics change due to deterioration with age.

For this reason, in order to judge not only whether the detection device is merely operating or not, but whether the accurate ignition timing control is achieved or not, it is necessary to check whether the detection sensitivity is appropriate or not.

SUMMARY OF THE INVENTION

It is an object of the present invention to provide an apparatus for controlling the ignition timing by checking the detection sensitivity of knocking and by correcting the detection sensitivity, if necessary.

The apparatus of the present invention gradually advances the angle of an ignition timing for a specific cylinder, then compares a previous output of a knock detection circuit for the cylinder having its angle thus advanced with the present output thereof by a comparator, evaluates the occurrence of a knock when an output signal from the comparator changes drastically in comparison with a previous evaluation, corrects a knock detection reference signal of the ignition timing control apparatus, and automatically corrects the knock detection sensitivity.

BRIEF DESCRIPTION OF THE DRAWINGS

FIG. 5 is a block diagram of a knock detecting device in an embodiment, to which the present invention is applied.

FIGS. 6A to 6H show signal waveforms at various parts in the block diagram of FIG. 5.

DETAILED DESCRIPTION OF THE PREFERRED EMBODIMENTS

Figure 1:
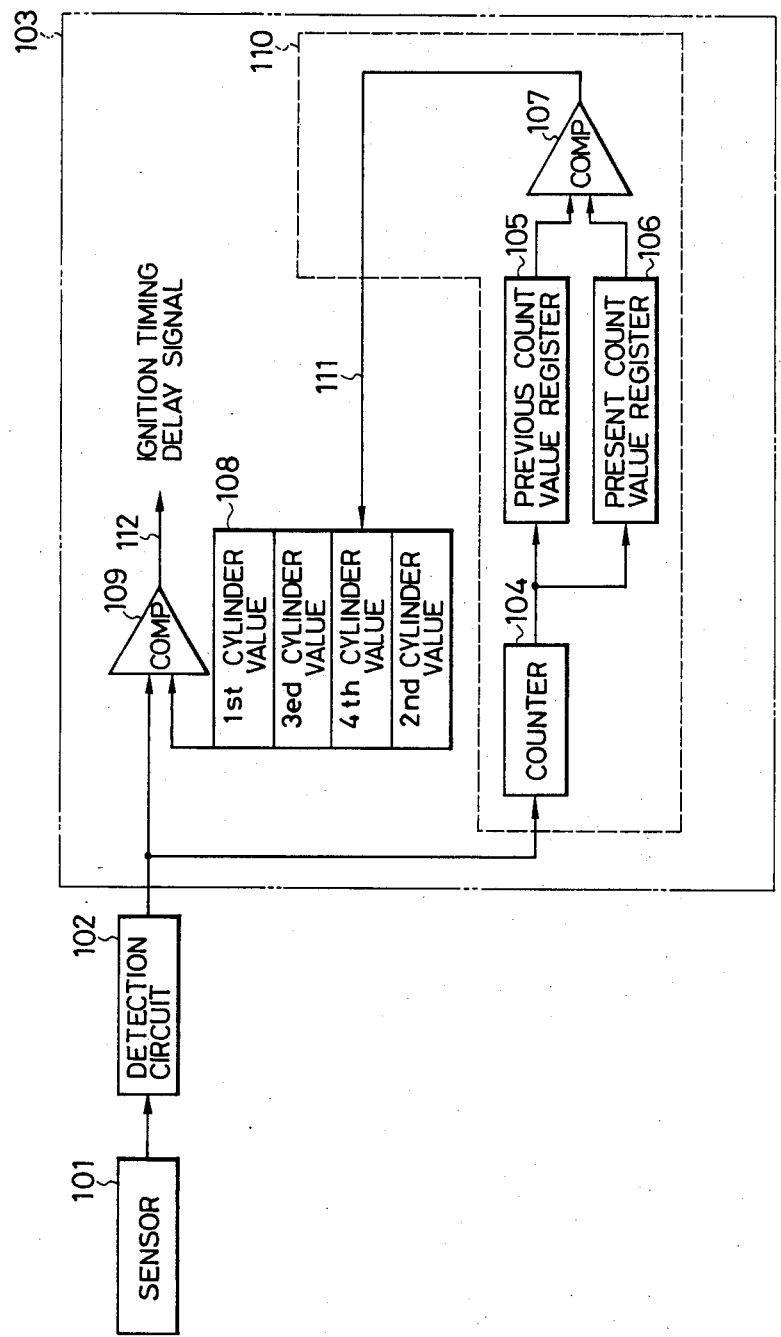
FIG. 1 is a block diagram showing the outline of the present invention.

Referring to FIG. 1, an apparatus for controlling ignition timing in accordance with the present invention comprises a sensor 101 for detecting a knocking, a detection circuit 102 for detecting signals of the sensor 101, and an ignition timing control apparatus 103 for correcting the ignition timing based on the output signal of the detection circuit 102. The ignition timing control apparatus 103 comprises a knocking pulse correction signal generation circuit 110 for outputting a knocking pulse correction signal 111 when a knocking detection pulse number increases drastically in comparison with the previous count after an ignition timing $\theta$ of at least one cylinder of the engine is advanced by a small amount to intentionally check the generation sensitivity of a knock detection signal, a reference signal circuit 108 for memorizing a knocking detection pulse in each cylinder (FIG. 1 shows a four-cylinder engine) based on the output signal 111 of the knocking pulse correction signal generation circuit 110, and a comparator 109 for comparing the signal of the detection circuit 102 with the signal of the reference signal circuit 108 and for producing an ignition timing delay signal 112 when knock occurs. The knocking pulse correction signal generation circuit 110 comprises a counter 104 for counting signals output from the detection circuit 102 after advancing the angle of the ignition timing of a specific cylinder by steps 808, 809, and 810 shown in FIG. 9 mentioned later, a register 105 for holding the previous count value output from the counter 104, a register 106 for holding the present count value output from the count 104, and a comparator 107 for comparing the previous count value with the present count value. In other words, the reference signal from the reference signal circuit 108 is changed according to the knocking count of the specific cylinder having its angle advanced.

Referring to an ignition timing control section of the internal combustion engine control apparatus 103 shown in FIG. 2, a central processing unit (hereinafter called "CPU") 12 executes digital calculation with various data including the ignition timing of the internal combustion engine. ROM 14 stores therein control programs for ignition timing control and the like, and fixed data. RAM 16 is a memory which can read-out and write-in. A back-up RAM 17 holds the memory content even if the internal combustion engine stops. CPU 12 receives signals from various sensors (a knock detector 30, a crank angle sensor 40, a load sensor 50, a water temperature sensor 60 and a load switch 80 are used in this embodiment) through an input-output interface circuit 20, calculates ignition timing on the basis of these signals in accordance with the program stored in ROM 104, and produces an ignition signal IGN through the input-output interface circuit 20. The ignition signal IGN is applied to the base of a power transistor 74 through an amplifier 72 so as to drive the transistor 74. When the transistor is cut off, an ignition current flows through the secondary coil of an ignition coil 76.

Figure 3:
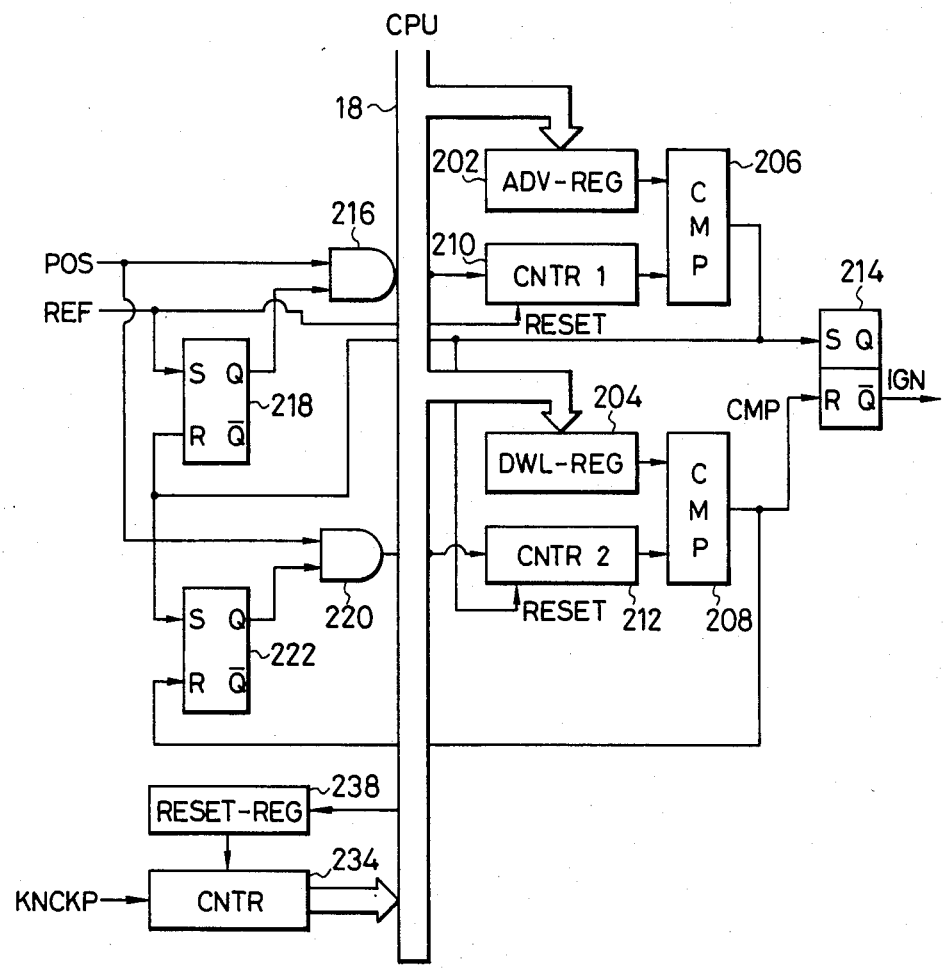
FIG. 3 is a block diagram showing the components relating to an ignition timing control of the input-output interface circuit of the embodiment shown in FIG. 2.

FIG. 3 shows schematically the components of the input-output interface circuit 20 which function in ignition timing control. A position pulse signal (hereinafter called "POS") from the crank angle sensor 40 is applied to AND circuits 216 and 220. A reference crank angle signal (hereinafter called "REF") from the crank angle sensor 40 is applied to the reset terminal of a first counter register 210 and to the set terminal of an RS flip-flop 218. The first counter register 210 starts counting POS at the timing of the rise of REF by means of the AND circuit 216 and the RS flip-flop 218, and outputs its count value to the comparator 206. The comparator 206 compares the count value of the first counter register 210 with the ignition timing data $\theta_{1g}$ which is calculated by CPU 12 and is stored in the advance register 202, and outputs the set pulse to the RS flip-flop 214 and resets the RS flip-flop 218 when they coincide. When the set pulse is applied to the RS flip-flop 214, the output of Q is cut off, the power transistor 74 of the ignition system is also cut off, and a discharge current flows through the secondary coil of the ignition coil 76.

Next, the current feed start timing of the ignition coil will be described. The second counter register 212 starts counting position pulses POS through the AND circuit 220 on the basis of the set pulse which turns ON the RS flip-flop 222 and is determined by the comparator 206, and outputs its count to the comparator 208. The comparator 208 compares this count with the value calculated by CPU 12 and stored in the dwell register 204, and outputs the reset pulse to the RS flip-flop 241 and resets the RS flip-flop 222 when they coincide. The RS flip-flop 214 produces an output at the Q terminal on the basis of the reset pulse, turns on the power transistor 74 and starts supplying the current to the primary coil of the ignition coil 76.

Next, the take-in operation of the knock signal KNCKP by CPU 12 will be described.

The output pulse KNCKP of the knock sensor 30 is applied to the counter register 234, and the number of KNCKP pulses proportional to the strength of a knock generated is counted. CPU 12 is interrupted when this counting is completed, and the count from the counter register 234 is taken by CPU 12 through the bus 18, while the count from the counter register 234 is cleared by the reset register 238 to prepare for the occurrence of the next knock. The number of pulses NP sent to CPU 12 is the data that corresponds to the knock strength, and is used to calculate the degree of ignition timing correction.

Figure 2:
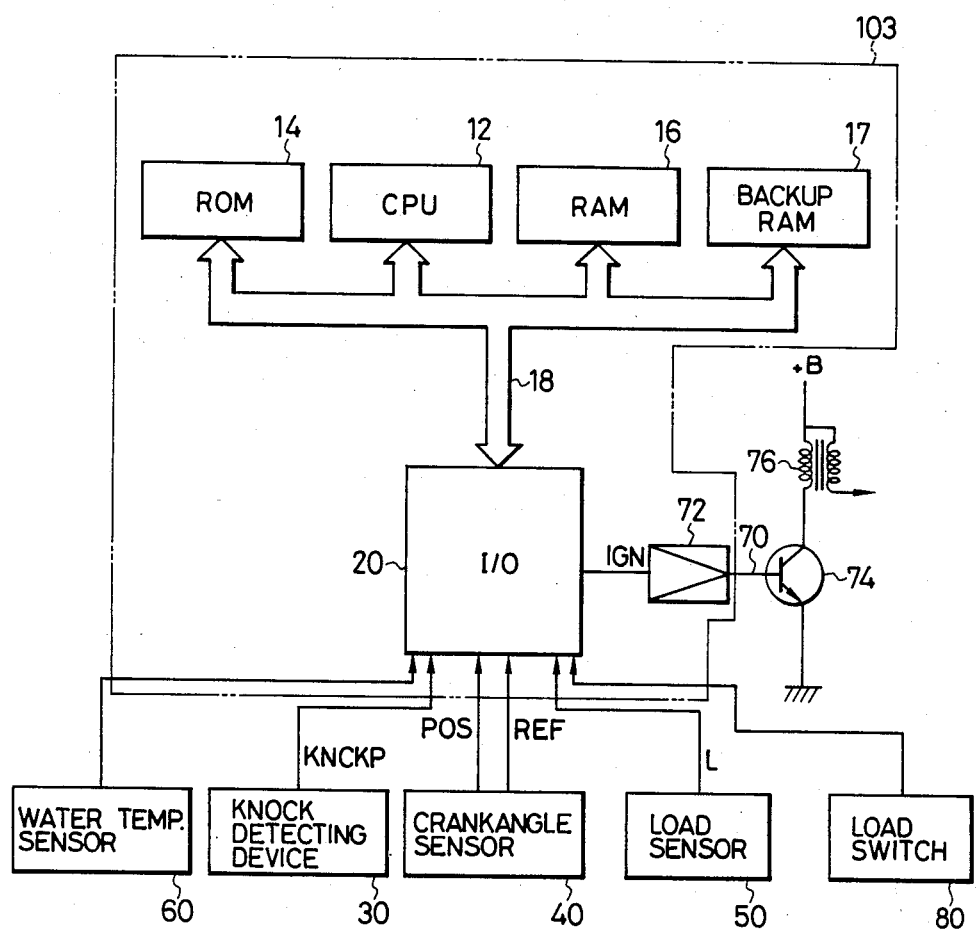
FIG. 2 is a block diagram showing the ignition timing control portion of an internal combustion engine to which the present invention is applied.
Figure 4:
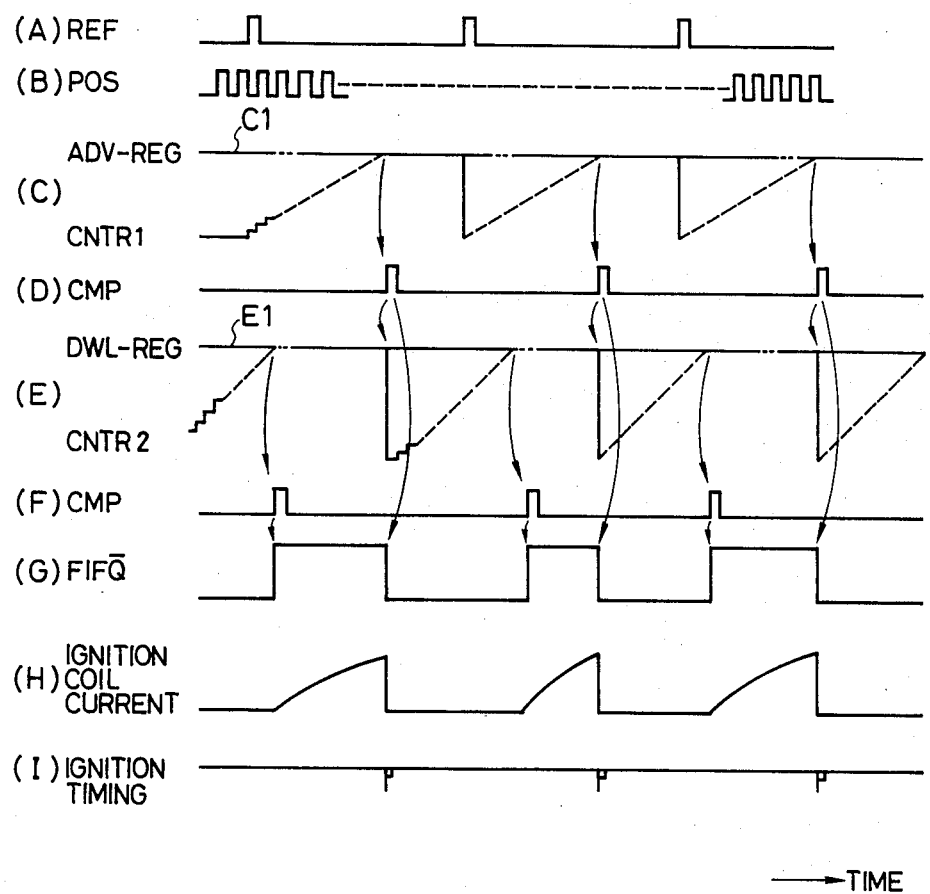
FIG. 4 is a timing chart showing the operation of the circuit shown in FIG. 3.

FIG. 4 is a timing chart showing the operation of the circuits shown in FIG. 2. In the drawing, (A) is a reference crank angle signal REF, (B) is a position pulse signal POS, and (C) shows the count in the first counter register 210. C1 represents the set value of the advance register 202. (D) represents the output signal of the comparator 206. It shows that the output is produced when the count in the comparator 206 reaches the set value of the advance register 202. (E) represents the count in the second counter register 212, and E1 is the set value in the dwell register 204. (F) represents the output of the comparator 208, which is the same as the comparator 206. (G) represents the outputs of the comparators 206 and 208, that is, the Q output of the RS flip-flop 214 corresponding to (D) and (F), respectively. (H) represents the current flowing through the ignition coil 66 in response to this Q output, and (I) represents the ignition timing.

Next, FIG. 5 shows a block diagram of the knock sensor 30 which generates a number of pulses KNCPK relative to the intensity of the knock. This knock sensor 30 corresponds to the detection circuit 102 shown in FIG. 1. In the drawing, a knock sensor 401 consists of a piezoelectric element which converts the knock vibration of a cylinder to an electric signal. The output signal $V_{IN}$ of this knock sensor 401 is applied to a band-pass filter 403 through an input processing circuit 402. The band-pass filter 403 accurately eliminates parasitic vibration of the engine, while permitting the knock signal to pass through the filter. The band width is selected so that it matches the frequency of the knock signal.

The knock signal passing through the band-pass filter 403 is rectified by a half wave rectification circuit 404, and is divided into two systems such that one system is used as the representative signal of knock and is amplified by a d.c. amplifier 405, while the other is used as a reference level for detecting knock and is smoothed by a smoothing circuit 406 and is thereafter amplified by a d.c. amplification circuit 407. A comparator 409 compares the signals of this system and outputs the knock detection signal to I/O 410.

FIGS. 6A–6H shows the signal waveform at each component of the block shown in FIG. 5. In the drawing, FIG. 6A represents the output VIN of the knock sensor 401, and FIG. 6B represents the waveform S1 after the input processing circuit 402. FIG. 6C represents the output waveform C2 of the band-pass filter 403, which is half-wave rectified in FIG. 6D, is then amplified to signal S4 (in FIG. 6E), is smoothed in FIG. 6F and is thereafter amplified in FIG. 6G). The knock detection signal KNCKP (FIG. 6H) can be obtained by comparison with this signal S6.

Figure 7:
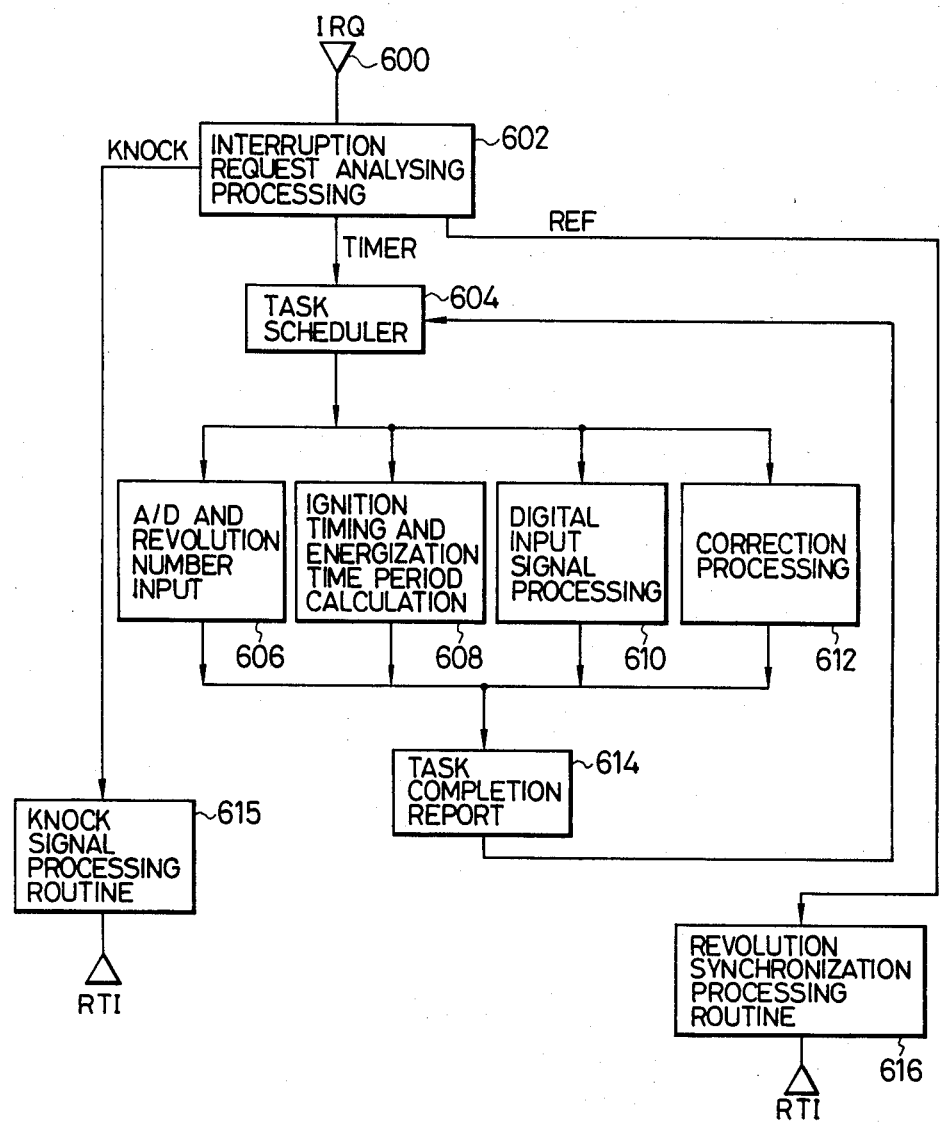
FIG. 7 is a general flow chart for explaining the operation of the ignition timing control apparatus of the present invention.

FIG. 7 is a general flow chart for the ignition timing control device in this embodiment. When an interrupt request 600 (IRQ) is generated in FIG. 7, CPU 12 judes whether it is knock (KNOCK), reference (REF), or timer interrupt (TIMER) in the interrupt request analysis processing of the next step 602.

TIMER is operated by an interrupt request from CPU 12 in every predetermined time. KNOCK is operated by an input signal from the detection circuit 102. REF is operated by the REF signal from the crankangle sensor 40. The automatic correction of the knock detection sensitivity by the apparatus for controlling ignition timing for the internal combustion engine of the present invention is commenced by the REF signal as apparent from the explanation mentioned later.

In FIG. 7, REF practices step 616 of a revolution synchronization processing routine, and KNOCK practices step 615 of a knock signal processing routine. The present invention is not limited to the embodiment shown in FIG. 7. The present invention includes the case in which step 615 can be practiced ahead of step 616, that is, between step 602 and step 616, when the KNOCK signal is generated after the REF signal is generated.

When TIMER is generated, each of the tasks, that is, A-D conversion of the input signal, the application of the number of engine revolution (606), calculation of ignition timing and power feed time (608), digital input signal processing (610) and correction processing (612) are executed in accordance with the instruction from a task scheduler 604.

When an interrupt request due to a knock is judged to be the result of interrupt request analysis processing at step 602, a knock signal processing routine is executed at step 615.

Figure 10:
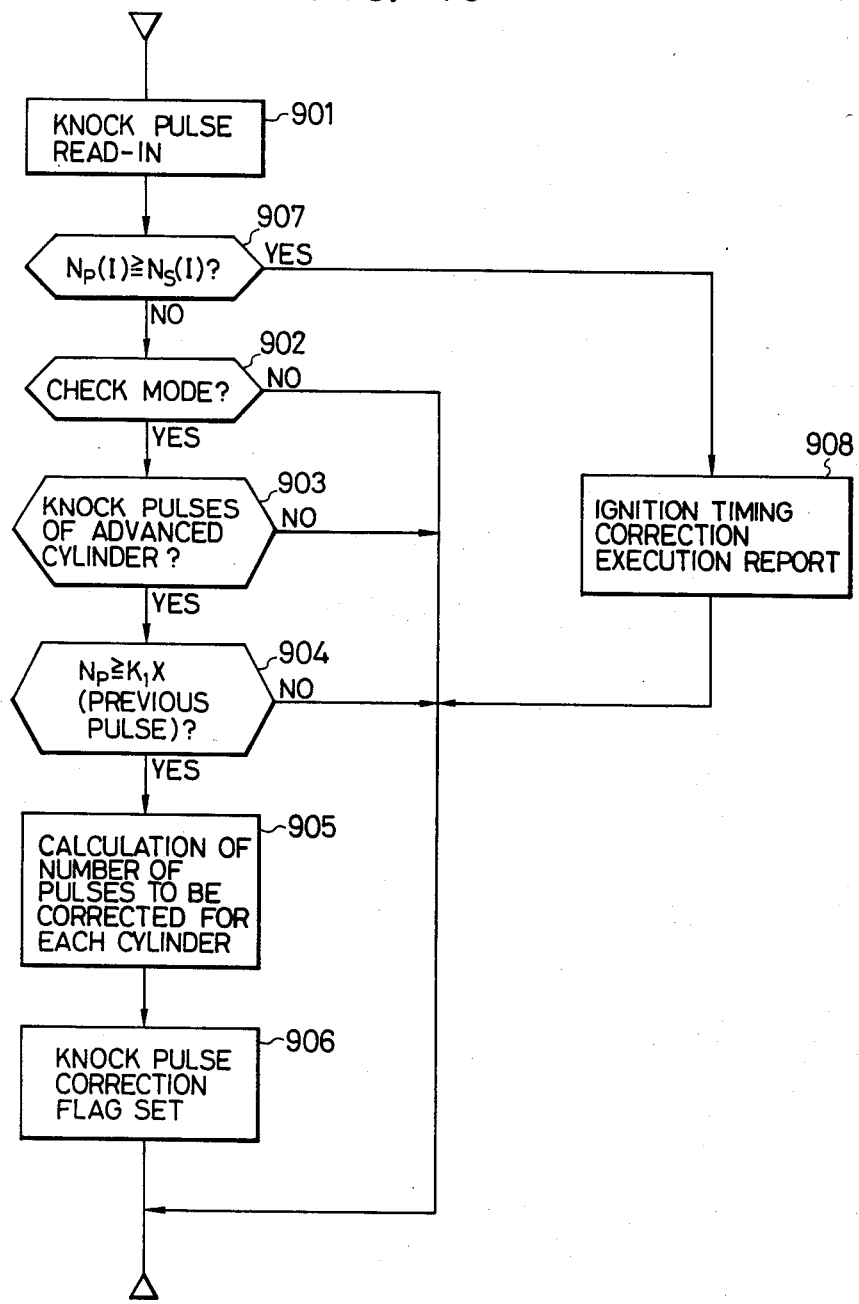
FIG. 10 is a flow chart showing the order of execution for the step of a knock signal processing routine shown in FIG. 7.

This knock signal processing routine is shown in FIG. 10. At step 901, the content $N_p$ of the counter register 234 is taken in. At step 907, the pulse number $N_p$ taken in at step 901 is compared with the knock detection set pulse $N_s$.

When $N_p$ is greater than $N_s$, the knock occurs, and an ignition timing correction execution flag is set at step 908.

When $N_p$ is smaller than $N_s$, judgement is made to determine whether the check mode is taking place or not at step 902.

To be the checking mode, for example, the engine revolution number N and engine load (equivalent to the engine negative pressure) are within a preset area, a predetermined time has proceeded since the engine revolution number (N) and engine load (L) are entered into the region of the above-mentioned preset area. When the mode is not the check mode, the revolution synchronization processing routine 616 is finished.

Figure 9:
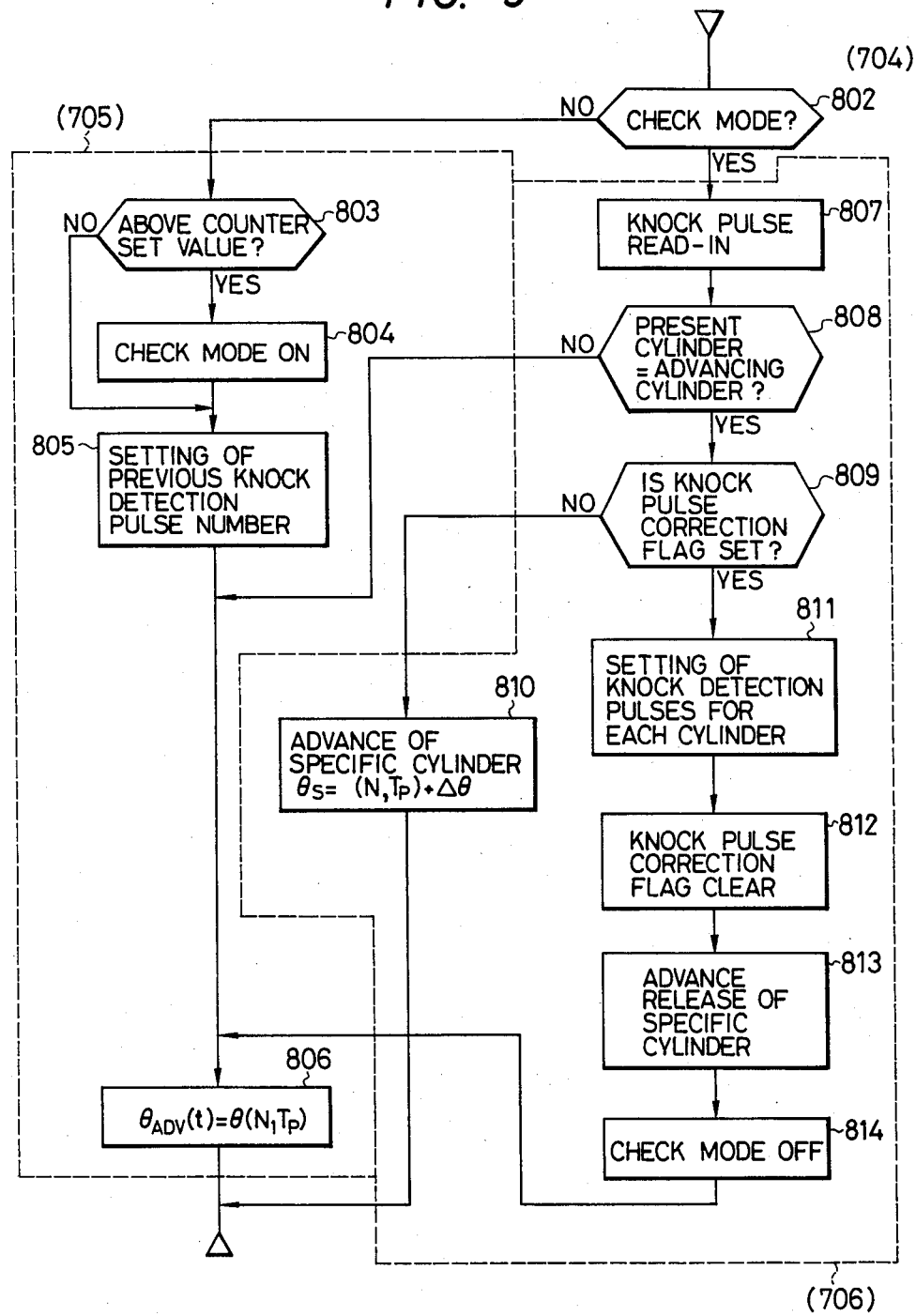
FIG. 9 is a flow chart showing the order of excution for the steps of a check mode, a check mode shift check, and a check mode execution shown in FIG. 8.

When the mode is determined to be the check mode at step 902, step 903 is followed, where judgement is made as to whether or not the present number of pulses is the number of pulses of the cylinder having its angle advanced by step 810 shown in FIG. 9. The judgement whether the pulses generated at present is that of the cylinder having its angle advanced or not, is taken place as follows. When a knocking signal is generated immediately after a specific cylinder (for instance, the first cylinder) is advanced in its angle, that knocking signal is judged to be the signal of the specific cylinder (the first cylinder) having its angle advanced. When it is the number of pulses of the cylinder having its angle advanced, the previous number of pulses of that cylinder is compared with the number of pulses $N_p$ read in, at step 904. Step 904 practices the calculation by the circuits 105, 106, and 107 shown in FIG. 1. If comparison shows that the number of pulses has increased drastically, judgement is made to the effect that a knock is occurring in the cylinder having its angle advanced.

Then, the difference between the present number of pulses and the number of pulses of the cylinder before the angle was advanced (i.e., the increment of the number of pulses) is calculated at step 905, and the knock in the cylinder having its angle advanced is reported at step 906 by outputting the knocking pulse correction signal 111 shown in FIG. 1, and the knock pulse correction flag is set.

When the interrupt request is found to be an interrupt request by the reference signal at step 602, shown in FIG. 7 a revolution synchronization processing routine is executed at step 616.

Figure 8:
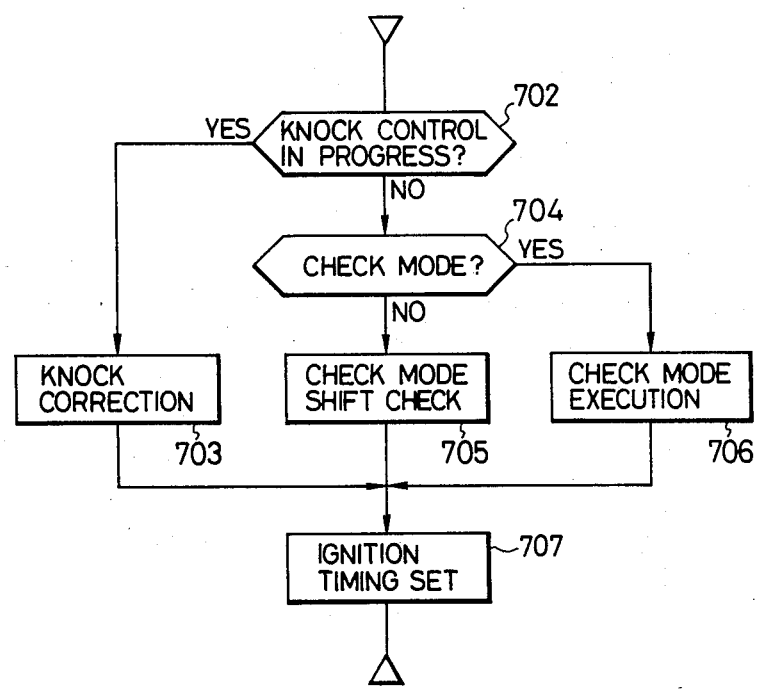
FIG. 8 is a flow chart of a revolution synchronization processing routine shown in FIG. 7.

FIG. 8 shows the ignition timing control routine which is executed at step 616. Judgement is made at step 702 as to whether or not a knock is being controlled. It is judged to be during knock controlling at step 702 when a value of $\Delta\theta_{ADV}(t)$ of step 753 shown in FIG. 14 mentioned later is minus or an ignition timing correction execution report of step 908 shown in FIG. 10 is executed. Knock correction is then made at step 703 if knock is judged to be under control according to a flow chart shown in FIG. 14 mentioned later. If knock is not being controlled, step 704 is followed, and judgement is made as to whether or not it is the check mode.

If the mode is found to be the check mode, the ignition timing of the specific cylinder is gradually advanced so as to cause knock. This advance angle control proceeds in such a manner that a control procedure stored in ROM 14 of the ignition timing control apparatus 103 shown in FIG. 2 is read out from ROM 14 by the CPU 12, and the CPU 12 commands so as to output its signal through the I/O 20, the amplifier 72, the transistor 74, and the ignition coil 76.

When knock occurs, the number of pulses of the output of the knock detection circuit increases drastically. The number of pulses which increases drastically when the specific cylinder is advanced is used to correct the knock detection pulses $N_s$ of the knock judgement circuit.

If the mode is not found to be the check mode at step 704, judgement is made as to whether or not the condition of the shift to the check mode is satisfied, and the previous set value is used as the knock detection number of pulses. The ignition timing is set to the ADV register at step 707.

The operation corresponding to steps 704, 705 and 706 will be described with reference to FIG. 9. Step 802 corresponds to step 704. If the mode is not judged to be the check mode which corrects the knock detection number of pulses at step 802, step 803 is followed. Step 803 consists of a counter for shifting to the check mode at a specific timing. If the content of the counter is above the set value, judgement is made that the shift to the check mode can be made, and instruction to shift to the check mode is made at step 804 by setting a flag. The previous knock detection number of pulses is used as such at step 805, and then step 806 is followed, where the value determined by the number N of revolutions of the engine and the load $T_p$ as the ignition timing, that is, ordinary ignition timing $\theta = \theta(N, T_p)$ is set.

When the mode is found to be the check mode, step 807 is followed, where the number of pulses of the knock detection circuit output of each cylinder is taken in before the angular advance of a particular cylinder to provide the knock detection set number of pulses $N_s$ of the knock judgement circuit for each cylinder. When the angle of a specific cylinder is advanced, the number of pulses for each cylinder is read each time at step 807.

At step 808, judgement is made as to whether the cylinder for which the routine shown in FIG. 9 is executed is the cylinder having its angle advanced. If the cylinder for which the routine is being executed is not the cylinder having its angle advanced, step 806 is followed. In other words, the ignition timing determined by the number N of revolutions of the engine and the load $T_p$ is set to the cylinders other than the cylinder having its angle advanced.

If the cylinder which is now operating is the cylinder which is advanced at the 808, step 809 is followed. At step 809, judgement is made as to whether the flag of the step 906 is set. If the knock correction flag is not set, step 810 is followed to advance the specific cylinder because the number of the pulses for the specific cylinder having its angle advanced does not increase drastically (knock does not occur). Here, $\theta_s = \theta(N, T_p) + \Delta\theta$. Though $\Delta\theta$ is a specific value in this embodiment, it may be a map value by the number N of revolutions of the engine and the load $T_p$. That is, $\Delta\theta = f(N, T_p)$ can be set.

If the flag in step 906 is set at step 809, knock occurs in the cylinder having its angle advanced, and the knock detection number of pulses $N_s$ for each cylinder is corrected at step 811. Step 812 is then followed, and since correction of the number of pulses $N_s$ is completed, the knock pulse correction flag is cleared, and step 813 is followed so as to release the advance of the cylinder having its angle advanced. Steps 811 and 812 correspond to the reference signal circuit 108 shown in FIG. 1. After step 813, step 814 is followed to turn off the check mode, and step 806 is followed. Thus, the knock detection number of pulses is corrected.

The process of correcting the knock detection number of pulses will be explained with reference to FIG. 11. In the drawing, (1) represents REF signal and (2) the cylinder number. For example, numeral 1 represents the first cylinder, and numeral 3 the third cylinder. In this embodiment, a specific cylinder is advanced, but in FIG. 11, only the case where the first cylinder of a four-cylinder engine is advanced will be described. In the drawing, symbols B, C, D and E represent the state immediately before the advance of the first cylinder. The numerals in FIG. 11(4) represent the knock pulse number when knock does not occur in the first cylinder before advance. In other words, four pulses in the first cylinder, five pulses in the third cylinder, three pulses in the fourth cylinder and two pulses in the second cylinder are detected in that order. The number of pulses for pulses for each cylinder are detected in that order. The number of pulses for each cylinder is read at step 807 shown in FIG. 9. In this case, knock does not occur.

Figure 11:
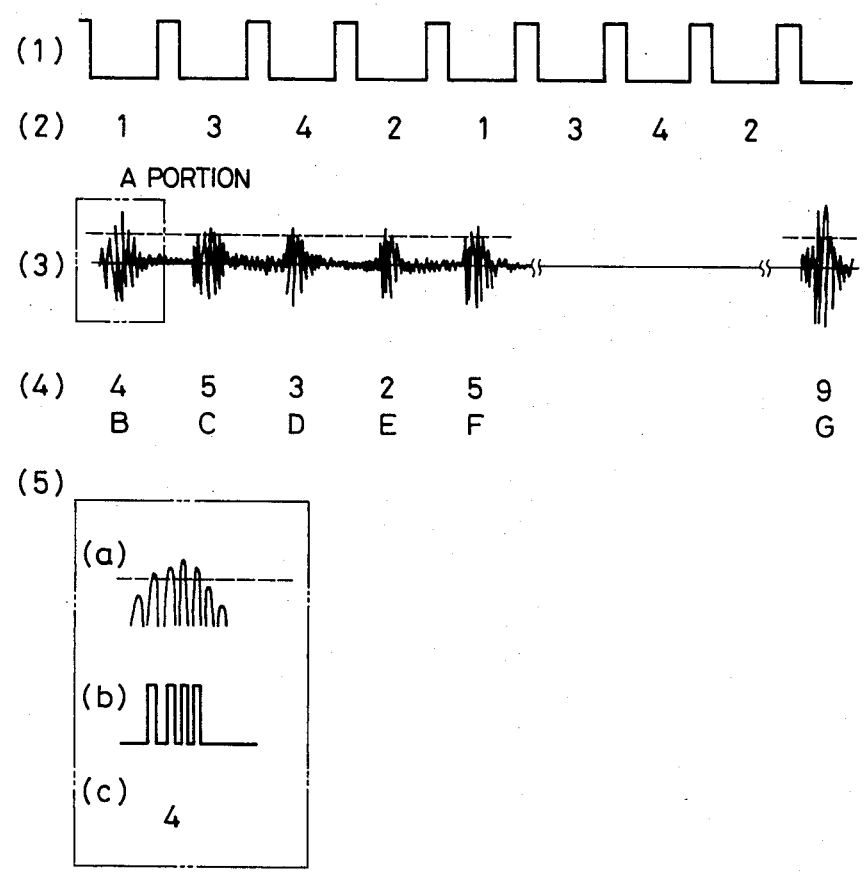
FIGS. 11 and 12 are diagrams for explaining the process of correction of the knock detection number of pulses.

When the first cylinder is advanced in accordance with step 810, knock occurs in the first cylinder, and the knock detection number of pulses increases drastically as represented by G in FIG. 11(4). Nine pulses are detected occurring at G. Here, the number of pulses to be corrected for each cylinder is $\Delta N_s = 9 - 4 = 5$. If the knock detection number of pulses set value is $N_s(I)$ at step 811 when knock occurs, the set value for the first cylinder is $N_s(I) = 5 + \Delta N_s = 9$, $N_s(3) = 5 + \Delta N_s = 10$ for the third cylinder, $N_s(4) = 3 + \Delta N = 8$ for the fourth cylinder and $N_s(2) = 2 + \Delta N_s = 7$ for the second cylinder. These values are set as the knock detection number of pulses after correcting $N_s(1)$ through $N_s(4)$ at step 811. FIG. 11(5) corresponds to FIG. 6H.

Figure 12:
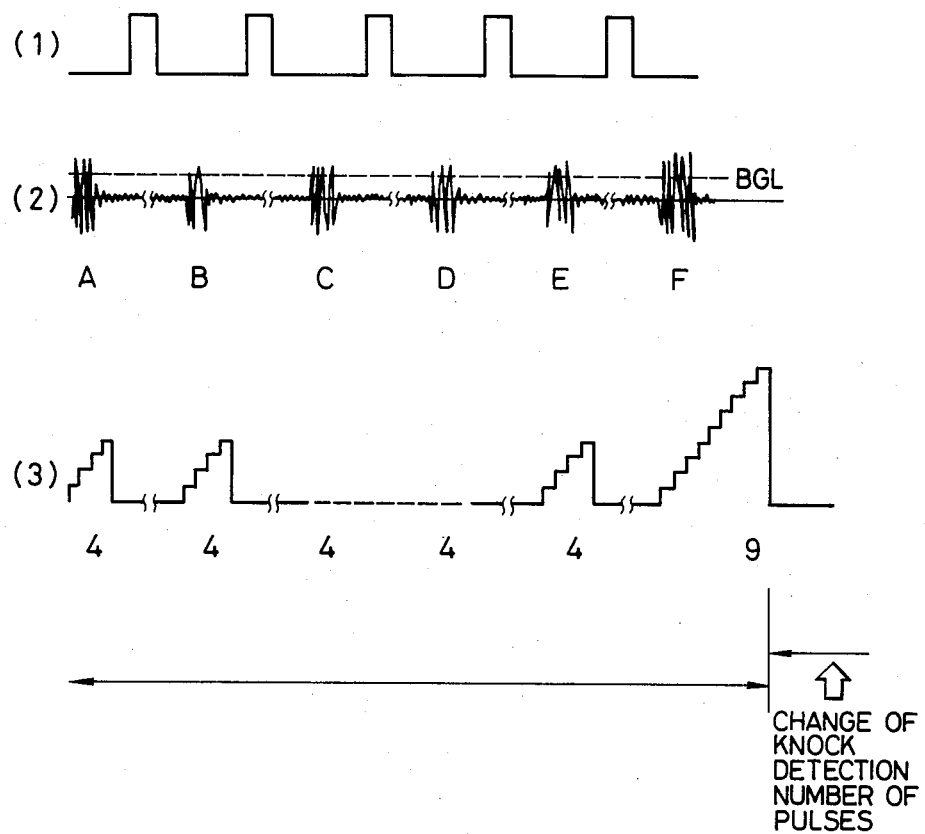

FIG. 12 shows only the first cylinder which is advanced among the four cylinders shown in FIG. 11. Only the first cylinder is gradually advanced from A to F. FIG. 12(2) shows the relation between the knock signal and the background level shown in FIG. 6G (BGL), and FIG. 12(3) shows the knock detection number of pulses. The knock detection number of pulses does not change but remains 4 in the range of A to F even when the first cylinder is gradually advanced. In other words, knock has not yet occurred in the first cylinder. The knock number of pulses increases drastically at F. That is, knock occurs in the first cylinder. Here, the difference 5 between the knock number of pulses 9 at F and the number of pulses 4 at A before advance is the corrected value of the knock detection pulses, and the knock detection number of pulses for each cylinder is re-written.

Figure 13:
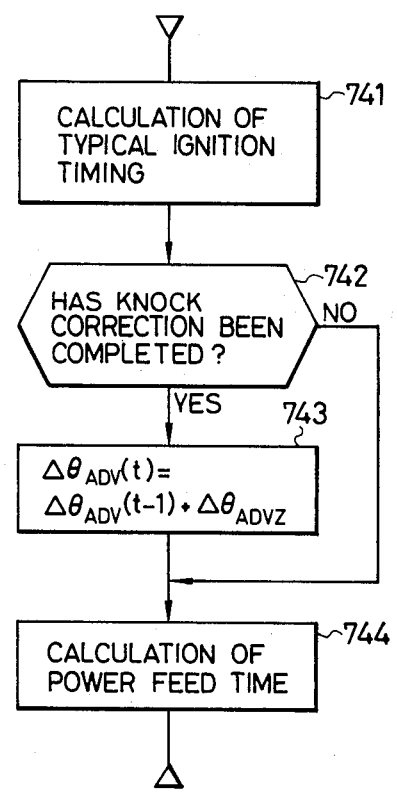
FIG. 13 is a flow chart showing the order of execution for the step of an ignition timing and energization time period calculation shown in FIG. 7.

The portion corresponding to step 608 shown in FIG. 7 will be described with reference to FIG. 13. At step 741, an ordinary ignition timing at which $\theta = f(N, T_p)$ is calculated from the number N of revolution of the engine and the load $T_p$ at the step 741. At the next step, 742, knock occurs and judgement (Y, N) is made as to whether or not ignition timing correction has been completed. If correction has not been completed, step 744 is followed. If the correction has been completed at step 742, the extent of ignition timing correction $\Delta\theta_{ADV}(t)$ is obtained in accordance with the following equation at step 743:

$$\Delta\theta_{ADV}(t) = \Delta\theta_{ADV}(t-1) + \Delta\theta_{ADV2}$$

In the equation above, $\Delta\theta_{ADV}(t-1)$ represents the extent of correction immediately before correction, and $\Delta\theta_{ADV2}$ is a typical correction.

Power feed time is calculated at step 744.

Figure 14:
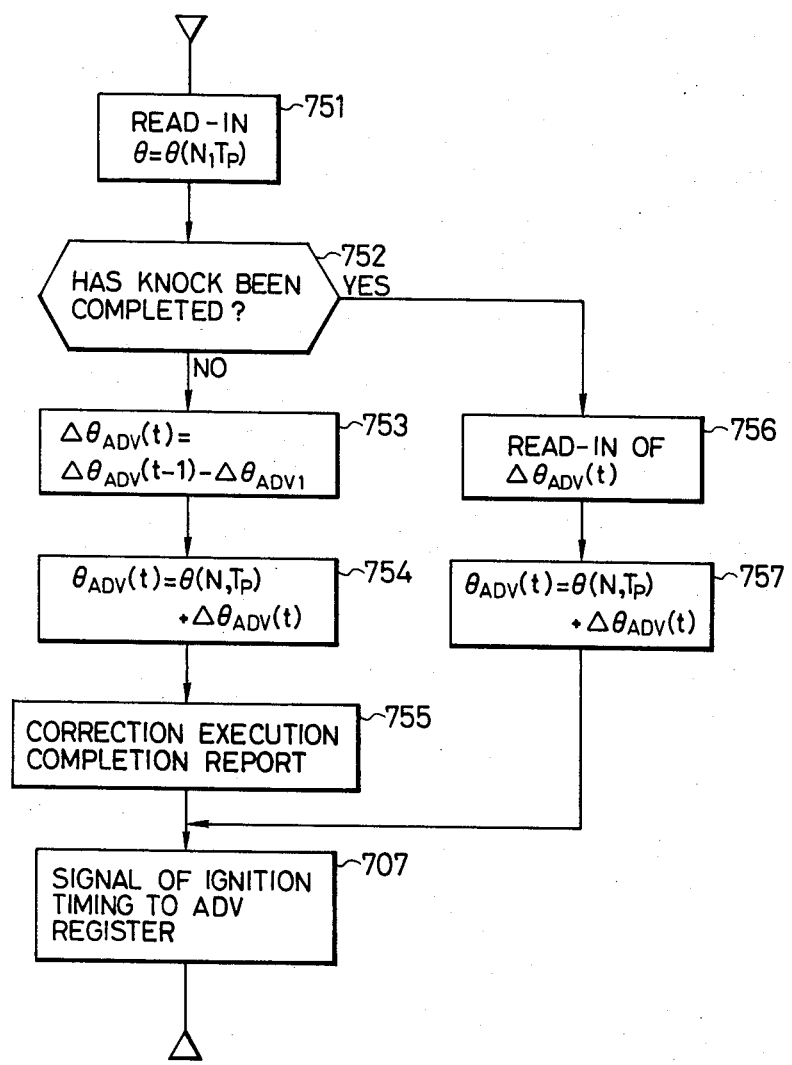
FIG. 14 is a flow chart showing the order of execution for the steps for knock correction shown in FIG. 8.

Knock correction corresponding to step 703 will be explained with reference to FIG. 14. Here, correction is made such that the extent of ignition timing correction $\Delta\theta_{ADV1}$ and the typical correction $\Delta\theta_{ADV2}$ are added to the typical ignition timing $\theta = \theta(N, T_p)$.

At step 751, typical ignition timing calculated at step 741 is read. At the next step, 752, judgement is made as to whether or not the ignition timing correction due to knock has been completed. If correction has not been completed, the extent of correction $\Delta\theta_{ADV}(t)$ of ignition timing is obtained in accordance with the following equation at step 753:

$$\Delta\theta_{ADV}(t) = \Delta\theta_{ADV}(t-1) - \Delta\theta_{ADV1}$$

In the equation above, $\Delta\theta_{ADV1}$ is the extent of correction at the time knock occurred, and $\Delta\theta_{ADV}(t-1)$ is the extent of correction immediately before the correction.

The extent of ignition timing correction $\Delta\theta_{ADV}(t)$ obtained at step 753 is added to the typical ignition timing $\theta$ obtained at step 751.

$$\Delta\theta_{ADV}(t) = \Delta\theta(N, T_p) + \Delta\theta_{ADV}(t)$$

After the correction is made at step 754, the correction execution report (flag reset) is made at the next step, 755, and the ignition timing $\Delta\theta_{ADV}(t)$ obtained at step 754 is set to the advance register at step 707.

If judgement is made at step 752 that the correction execution due to knock has been completed, step 756 is followed, and the ignition timing correction quantity $\Delta\theta_{ADV}(t)$ calculated at step 743 is read. The degree of ignition correction $\Delta\theta_{ADV}(t)$ read at step 743 is added to the typical ignition timing $\theta(N, T_p)$ at step 757.

Ignition timing which has been moved back due to the occurrence of knock is simultaneously advanced as knock is corrected.

Ignition timing $\Delta\theta_{ADV}(t)$ obtained at step 757 is set to the advance register at step 707.

As described above, a specific cylinder is advanced, and the knock detection reference pulse number for each cylinder is corrected by the number of pulses of the knock detection circuit output of the specific cylinder which has been advanced, thereby correcting knock detection sensitivity.

As can be understood clearly from the foregoing description, the present invention can automatically adjust the detection sensitivity of the knock evaluation circuit, and can provide an igniter for an internal combustion engine which can optimize ignition timing.

What we claim is:

1. An apparatus for controlling ignition timing for an internal combustion engine comprising a knock sensor, a memory into which a knock evaluation reference value is written, an evaluation circuit which produces an ignition timing angle delay signal when the signal form said knock sensor exceeds said knock reference value written into said memory, means for gradually advancing the angle of ignition timing for a specific cylinder, and means for re-writing the knock evaluation reference value of said memory when a knock is generated by said advancing means, wherein said means for gradually advancing the angle of ignition timing for a specific cylinder is operated when the engine revolution number and engine load are within a preset area after a reference crank angle signal from a crank angle sensor is generated.

2. An apparatus for controlling ignition timing for an internal combustion engine as defined in claim 1, characterized in that said means for gradually advancing the angle of ignition timing for a specific cylinder includes means for further advancing the angle of ignition timing of said specific cylinder when the knock signal of said specific cylinder does not increase drastically.

3. An apparatus for controlling ignition timing for an internal combustion engine as defined in claim 1, characterized in that said means for gradually advancing the angle of ignition timing for a specific cylinder includes means for correcting the number of knock detection pulses previously stored in said memory for each cylinder based on the knock signal when said knock signal of said specific cylinder increases drastically.

4. An apparatus for controlling ignition timing for an internal combustion engine as defined in claim 1, characterized in that said means for re-writing the knock evaluation reference value of said memory includes means for outputting a signal to said memory for correcting a knock detection signal stored in said memory for each cylinder, when a corresponding value of a present knock detection signal is larger than that of a previously measured knock detection signal of said specific cylinder.

5. An apparatus for controlling ignition timing for an internal combustion engine as defined in claim 1, characterized in that said knock evaluation reference value is a number of pulses.

6. An apparatus for controlling ignition timing for an internal combustion engine as defined in claim 1, characterized in that said memory stores alternate values of said knock evaluation reference value for each cylinder based on a knocking pulse correction signal output from said means for re-writing said knock evaluation value.

7. An apparatus for controlling ignition timing for an internal combustion engine comprising a knock sensor, a detection circuit for detecting signals of said knock sensor, a memory into which a knock evaluation reference value is written, an evaluation circuit which produces an ignition timing angle delay signal when the signal from said knock sensor exceeds said knock reference value written into said memory, means for gradually advancing the angle of an ignition timing for a specific cylinder, means for re-writing the knock evaluation reference value of said memory when the output signal of said detection circuit corresponding to said specific cylinder is changed drastically and said means for gradually advancing the angle of ignition timing for said specific cylinder operates when the engine revolution number and engine load are within a preset area.

8. An apparatus for controlling ignition timing for an internal combustion engine as defined in claim 7, characterized in that said means for gradually advancing the angle of the ignition timing for said specific cylinder works after a predetermined time has proceeded and said engine revolution number and said engine load are entered into the region of said preset area.

9. An apparatus for controlling ignition timing for an internal combustion engine as defined in claim 7, characterized in that said means for gradually advancing the angle of ignition timing for a specific cylinder includes means for further advancing the angle of ignition timing of said specific cylinder when the knock signal of said specific cylinder does not increase drastically, and said means ceases to advance the angle of ignition timing of said specific cylinder when the output signal of said detection circuit is drastically changed and the knock evaluation reference value of said memory is rewritten.

* * * * *